United States Patent
Balakrishnan

(10) Patent No.: US 10,120,748 B2
(45) Date of Patent: Nov. 6, 2018

(54) FAULT MANAGEMENT SERVICE IN A CLOUD

(71) Applicant: HEWLETT PACKARD ENTERPRISE DEVELOPMENT LP, Houston, TX (US)

(72) Inventor: Sandhya Balakrishnan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 168 days.

(21) Appl. No.: 15/038,069

(22) PCT Filed: Nov. 26, 2013

(86) PCT No.: PCT/US2013/072033
§ 371 (c)(1),
(2) Date: May 20, 2016

(87) PCT Pub. No.: WO2015/080705
PCT Pub. Date: Jun. 4, 2015

(65) Prior Publication Data
US 2016/0357625 A1 Dec. 8, 2016

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 11/0772* (2013.01)

(58) Field of Classification Search
CPC ............ G06F 11/0793; G06F 11/0709; G06F 11/0751; G06F 11/0772; G06F 11/079; G06F 11/07; G06F 11/0703; G06F 11/0766; G06F 11/0769; G06F 11/3003; G06F 11/3006; G06F 11/3065
See application file for complete search history.

(56) References Cited

U.S. PATENT DOCUMENTS

| 6,012,152 A * | 1/2000 | Douik ............... G06F 11/0709 714/26 |
| 6,665,262 B1 | 12/2003 | Lindskog et al. |
| 2002/0052718 A1 | 5/2002 | Little et al. |
| 2006/0224544 A1 | 10/2006 | Ojr |
| 2006/0265630 A1 * | 11/2006 | Alberti ..................... G06F 8/65 714/38.12 |
| 2007/0179746 A1 | 8/2007 | Jiang et al. |

(Continued)

OTHER PUBLICATIONS

Joshi et al., "Probabilistic Model-Drive Recovery in Distributed Systems", IEEE, May 12, 2010, 16 pages.

(Continued)

*Primary Examiner* — Bryce P Bonzo
*Assistant Examiner* — Anthony J Amoroso
(74) *Attorney, Agent, or Firm* — Trop, Pruner & Hu, P.C.

(57) ABSTRACT

Provided is a method of providing a fault management service in a cloud. During requisition of a cloud service involving a service element provided by the cloud it is determined whether solutions are available for potential faults related to the service element. The available solutions are highlighted for potential faults related to the service element to a user. Upon selection of a highlighted solution by the user, the selected solution is applied to the service element.

20 Claims, 5 Drawing Sheets

(56) References Cited

U.S. PATENT DOCUMENTS

| | | | | |
|---|---|---|---|---|
| 2009/0063387 | A1* | 3/2009 | Beaty | G06N 5/04 |
| | | | | 706/50 |
| 2010/0115348 | A1* | 5/2010 | Gilluwe | G06F 9/453 |
| | | | | 714/57 |
| 2011/0060946 | A1 | 3/2011 | Gupta et al. | |
| 2012/0066218 | A1 | 3/2012 | Rapp et al. | |
| 2013/0227103 | A1* | 8/2013 | Garimella | H04L 41/5054 |
| | | | | 709/223 |

OTHER PUBLICATIONS

Korean Intellectual Property Office, International Search Report and Written Opinion, dated Aug. 29, 2014, Daejeon Metropolitan City, Republic of Korea, 10 pages.

Nagpal et al., "A Study on Adaptive Fault Tolerance in Real Time Cloud Computing", International Journal of Advanced Research in Computer Science and Software Engineering, ISSN: 2277 128X, vol. 3, Issue 3, Mar. 2013, 3 pages.

* cited by examiner

FAULT MANAGEMENT SERVICE IN A CLOUD

CROSS-REFERENCE TO RELATED APPLICATION

This application is a U.S. National Stage Application of and claims priority to International Patent Application No. PCT/US2013/072033, filed on Nov. 26, 2013, and entitled "Fault Management Service In A Cloud," the entire content of which is hereby incorporated in its entirety.

BACKGROUND

Cloud computing has evolved as an alternate model to regular computing operations of an enterprise. Generally speaking, cloud computing involves delivery of computing as a service rather than a product, whereby shared resources (software, storage resources, etc.) are provided to computing devices as a service. The resources are shared over a network, which is typically the internet. Cloud computing thus provides a quick and scalable access to computing resources and information technology (IT) services.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
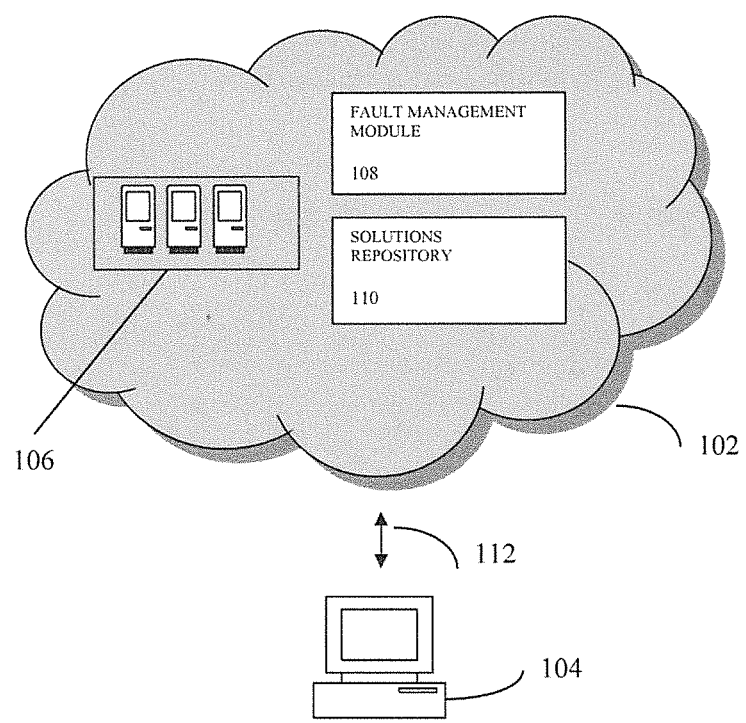
FIG. 1 illustrates a system for facilitating a fault management service in a cloud, according to an example.

Cloud computing has fundamentally changed the way IT services are delivered to enterprises. It has enabled companies to focus on their core competencies by helping them reduce costs and providing much needed scalability to IT resources required for effective functioning. Cloud computing has also brought operational efficiency to organizations by automating provisioning and deprovisioning of IT resources thereby freeing customers or personnel from an endless wait for routine resources like storage, servers, network components, etc.

However, this on-demand availability of IT resources may result in the creation of a virtual computing sprawl which may be difficult to manage. Since the workloads are run virtually in a cloud, the cloud users may or may not have access to many elements like infrastructure, platform etc. as in traditional IT. This virtual connect to services could become problematic for businesses when faced with an issue, and may lead to a delayed problem resolution where much time is invested in debugging, trial and error runs, restarts, querying cloud operator and waiting endlessly for an effective response.

Typically, an IT administrator relies on monitoring solutions for detection, reporting and isolation of problems with an IT resource in an IT infrastructure. These monitoring solutions although useful do not help IT personnel move beyond the usual cycle of detect-and-repair. In other words, a repair action is pursued only after the detection of a problem. There's no mechanism to pre-empt the occurrence of a problem and application of a solution before the problem actually occurs in an IT resource. Needless to say, this could be trying for IT personnel who end up constantly monitoring a number of IT resources for performance, availability and security.

Proposed is a solution that provides a proactive fault management service in a cloud infrastructure. The solution includes creation of a repository of solutions for potential faults related to a service element in the cloud. During requisition of a new cloud service involving the service element, the solutions for potential faults related to the service element are highlighted to a user who may select a solution for application to the service element from the highlighted solutions. The selected solution is then applied to the service element thereby providing a proactive redressal to a potential fault or issue with a service element intended to be used in a service instantiation on the cloud. In an implementation, the solutions repository is regularly updated with new solutions as and when they become available.

The proposed solution offers an up-to-date proactive fault redressal mechanism for IT resources in a cloud. Instead of "problem first, solution later" approach, it focuses on preventing the problem from occurring. Knowledge, expertise, information and solutions scattered in an organization are pooled together in a solutions repository which is proactively deployed for fault resolution in a cloud infrastructure.

As used herein, the term "service element" includes a computing resource such as an information technology (IT) infrastructure resource (such as processor, memory, storage, network resource, etc.), operating system (platform) resource, and/or application (software) resource. Additionally, the term "cloud service" means a service deployed in a cloud computing environment (or "cloud") using a service element (or service elements) which may include an (IT) infrastructure resource, a platform, an application, or any combination thereof. By way of non-limiting examples, a cloud service may include a compute service, network service, storage service, a business process, an IT process, etc.

FIG. 1 illustrates a system for facilitating a fault management service in a cloud, according to an example. System 100 includes a cloud 102 and user computer system 104.

As used herein, the term "cloud" may include a public cloud, a private cloud, a hybrid cloud or a traditional data center offering cloud services. Cloud 102 could offer, provide or deploy various types of cloud services for a user or customer. These could include Infrastructure as a Service (IaaS), Platform as a Service (PaaS), Software as a Service (SaaS), and so forth. Cloud 102 may include various types of service elements (or computing resources). These computing resources may be hardware resources, software resources, or any combinations thereof. For example, hardware resources may include computer systems, computer servers, workstations, or any other computer devices. And, software resources may include operating system software (machine executable instructions), firmware, and/or application software. Computing resources may also include virtual machines, virtual servers, storage resources, load balancers, firewalls, etc. In an implementation, some or all of the computing resources provided by cloud 102 may be utilized by a user (customer) of cloud 102. Computing resources (in cloud 102) that are used (or hired) by a user constitutes the cloud computing infrastructure of the user on a cloud 102. In the present illustration, cloud computing infrastructure 106 on cloud 102 constitutes the cloud computing infrastructure of a user.

In an implementation, cloud includes fault management module 108 and solutions repository 110. Fault management module 108 determines during requisition of a cloud service involving a service element provided by the cloud whether solutions are available for potential faults related to the service element, highlights the available solutions for potential faults related to the service element to a user, and upon selection of a highlighted solution by the user, applying the selected solution to the service element. In an example, said user is a cloud architect or service designer. A cloud architect (or service designer) creates templates that are usable by other people like an administrator, operator, etc. Solutions repository 110 comprises solutions for problems or faults related to a service element (or service elements) provided in a cloud. In one example, the solutions repository 110 is created by a cloud service provider offering the service element to a user via a cloud service. In another example, the solutions repository 110 may be created by a user of a service provided by a cloud.

In an implementation, cloud computing infrastructure 108 may be managed through user computer system 104, which is communicatively coupled to cloud through computer network 112. User computer system 104 may be, for example, a computer server, desktop computer, notebook computer, tablet computer, mobile phone, personal digital assistant (PDA), or the like. User computer system 104 may include a processor for executing machine readable instructions and a memory (storage medium) for storing machine readable instructions. Computer network 112 may be a physical or wireless network. Further, computer network 112 may be a public network such as the Internet, or a private network such as an intranet.

It would be appreciated that the components depicted in FIG. 1 are for the purpose of illustration only and the actual components (including their number) may vary depending on the computing architecture deployed for implementation of the present invention.

Figure 2:
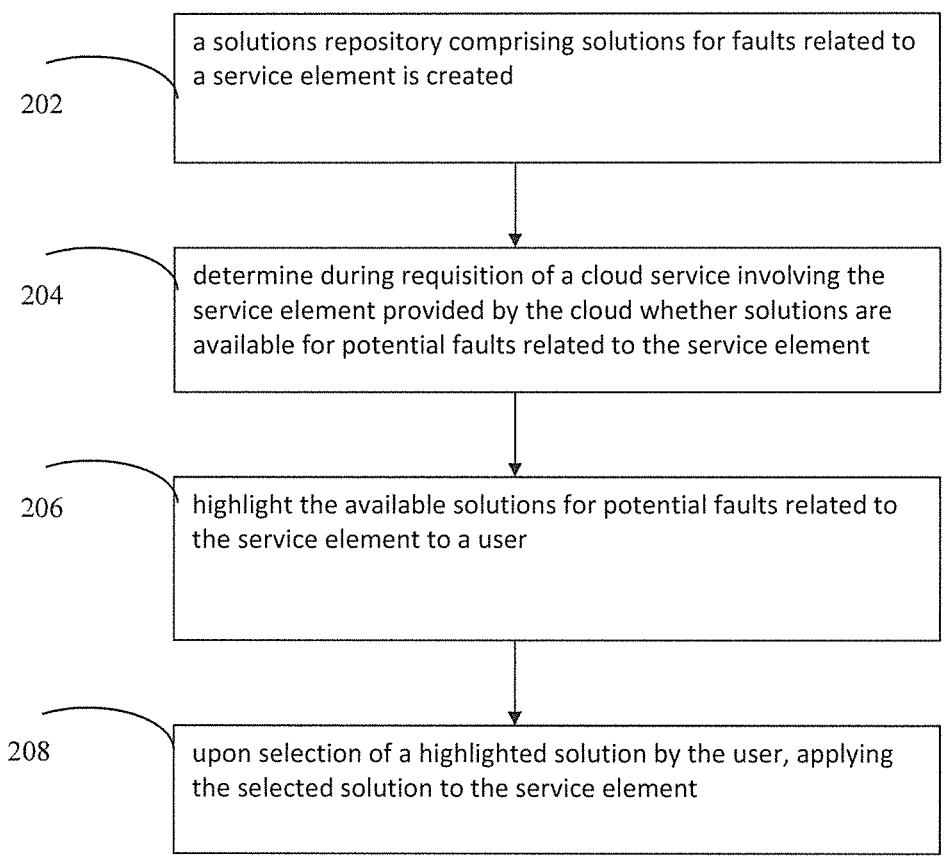
FIG. 2 illustrates a method of providing a fault management service in a cloud, according to an example.

FIG. 2 illustrates a method of providing a fault management service in a cloud, according to an example. At block 202, a solutions repository comprising available or known solutions for problems or faults related to a service element (or service elements) provided in a cloud is created. As mentioned earlier, a "service element" includes a computing resource such as an information technology (IT) infrastructure resource (such as processor, memory, storage, network resource, etc.), operating system (platform) resource, and/or application (software) resource.

In one example, the solutions repository is created by a cloud service provider offering the service element to a user via a cloud service. In another example, the solutions repository may be created by a user of a service provided by a cloud. The solutions repository may be created on a cloud provided by a cloud service provider or a system used by a user of the cloud.

In an implementation, creating the solutions repository involves harnessing the knowledge and expertise scattered across various tools and personnel of an organization (for example, a cloud service provider or an enterprise user). In one example, subject matter experts could be consulted to garner domain specific knowledge. For instance, a database manager may be used to obtain information regarding problems, faults, causes, issues, best practices, bug fixes, updates, guidelines etc. along with solutions, remedies, fixes, patches, and so forth related to databases. Similarly, a network specialist could be employed to obtain like information and solutions pertaining to networking resources like routers, switches, hubs, etc. To provide another example, there are many tools and applications that are shipped along with directions, recommendations, best practices, actions for a problem scenario, etc. Those could be used for building the solutions repository as well. Thus, a solutions repository would comprise solutions for problems or faults related to a service element.

The solutions for faults related to a service element may vary depending on the type of service element (i.e. computing resource). Further, there could be different types of solutions. For example, a solution could be an automated script, a pseudo-code which the end-user can leverage in his environment, or plain instructions which the end-user can refer to for execution. The application of a solution to a service element for a fault which is yet to occur is akin to applying a "vaccine" for immunizing the computing resource against the occurrence of the problem.

In an implementation, the solutions present in the solutions repository are classified according to a criterion (or criteria). In an example, the classification may be based on whether automatic or manual intervention is needed for application of a solution to a service element. In other words, whether a solution could be automatically applied to a service element or a manual intervention (or selection) by a user is needed. For solutions that can be automated or directly applied on a target service element, a run-book automation tool could be used to automate the process. Another simple approach would be to use scripts that directly execute on a target service element. In a case a manual intervention or selection is needed, the instructions or information can be either in the form of an Ops workflow or passed as a checklist for an administrator to validate after provisioning.

Figure 3:
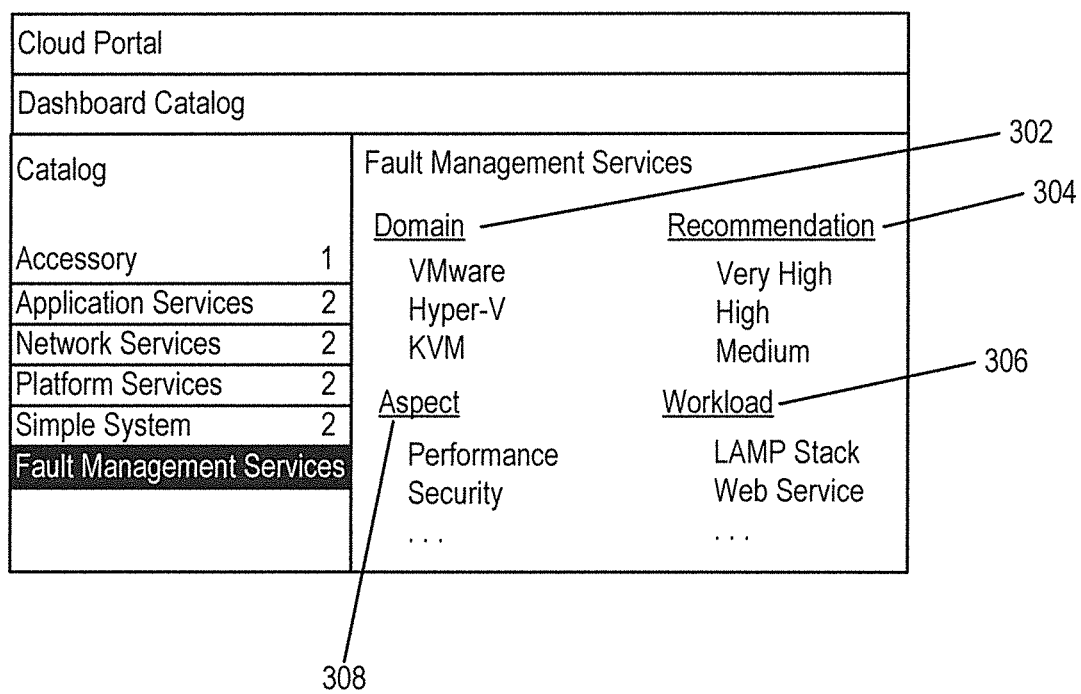
FIG. 3 illustrates a few example classifications of solutions present in a solutions repository.

The solutions could also categorized in many ways such as based on domain (for example, VMware, Hyper-V, KVM, etc.), platform or application (for example, Oracle, Java, etc.) or aspect (such as performance, security, configuration, etc.). They can also be classified at the topology level for a given workload like LAMP Stack which may define all the solutions for a given workload collectively. Another approach could be to classify the solutions based on problem impact or severity if the solution is not applied (such as very high recommendation, high recommendation, etc.). FIG. 3 illustrates a few example classifications 302, 304, 306 and 308 of representative solutions in a solutions repository.

In an implementation, the solutions present in the repository are tagged with unique, intuitive and descriptive identifier(s) to ease their identification. For example, a solution concerning memory considerations for an enterprise Java Application may be tagged: "Java Applications", "VMWare", "Performance" etc.

The solutions repository may be regularly updated with new solutions for potential faults related to the service element.

At block 204, during requisition of a cloud service involving a service element provided by the cloud a determination is made whether solutions are available for potential faults related to the service element. In other words, upon request of a user for a cloud service (or a new instantiation of a cloud service) to a cloud service provider wherein in the service request the user identifies or specifies a service element (service elements) required by the user (as part of the requested service), it is ascertained whether any solutions are available for potential problems or faults related to the service element (or service elements).

In one implementation, a user (for example, a cloud architect) designs the workload topology (i.e. service request) identifying various service elements (i.e. computing resources) required from the cloud. A service request could also be in the form of a service template specifying target computing resources required to deploy a service required by a user. A user may utilize the infrastructure, platform, application services or any combination thereof, offered by the cloud, to create either elemental, partial or complete systems with well defined relations. In another example, a service definition is done interactively by a service designed from the cloud service provider who makes cloud services available to customers. The service designer determines the building blocks (or service elements) in each service design template. To provide an example with reference to FIG. 1, in the illustration cloud computing infrastructure comprises of three server computers for a hosting an application (not shown) requisitioned by a user. Thus, a service template designed in this case would include the three server computers and the application which is desired to be hosted on the cloud.

In an implementation, a previously created repository comprising solutions for potential faults related to various service elements (block 202) is searched for determining whether a solution(s) is/are available for a potential fault related to a service element identified in a cloud service request. In an example, said solutions repository is present in the cloud that receives a service request from a user.

At block 206, if it is determined (at block 204) that a solution (or solutions) is/are available for potential faults related to a service element (or service elements), the existing solution are highlighted to a user for making a selection. A user interface component may be used to display solutions available against potential faults related to a service element. In an example, the highlighted solutions are displayed as a checklist for selection by a user.

As mentioned earlier, the solutions could be classified in various ways depending on the criterion used. Also, self-explanatory tags may be displayed along with the highlighted solutions to help a user make an appropriate selection. To provide an example, upon receipt of a service request requiring a VMware VM Server, the following solutions with tags and recommendations may be highlighted to a user:

(a) Install and Enable VMware tools on VM (Recommendation—High; Tags—VMware, VM, Guest, Performance; Description—Enables performance by use of balloon driver)

(b) Using NTP for clock synchronization (Recommendation—High; Tags—VMware, Clock Synchronization; Description—Use in the cloud if the admin node and the managed nodes need to synchronize the clocks)

(c) Enabling DRS (Recommendation—Medium; Tags—VMware, Capacity; Description—For Migration)

Figure 4:
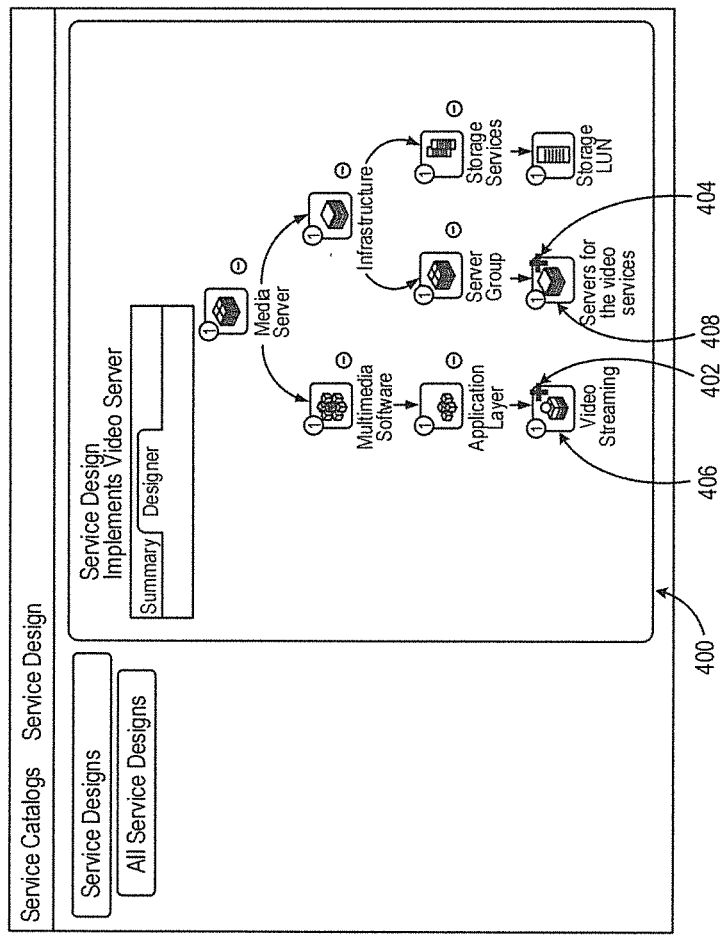
FIG. 4 illustrates a user interface component for indicating the availability of a solution applicable to a service element, according to an example.

The availability of a solution which could be applied to a service element may be indicated by a Graphical User Interface (GUI) component. This is illustrated in FIG. 4. In one example, the availability of a solution could be depicted by using a symbol (for example, a "+" sign) alongside the relevant service element in a service template. The user could then browse the solutions classification against each service element and choose those applicable for the use case during binding. In FIG. 4, "+" symbols 402 and 404 indicate that solution(s) against potential faults are available for service elements 406 and 408 respectively in service template 400.

At block 208, a user may select a solution(s) for application to a service element. Upon selection of a highlighted solution by a user, the selected solution is applied to the service element to prevent the occurrence of a potential fault. In an implementation, the selected solution is applied prior to deployment of the new cloud service involving the service element or prior to an occurrence of a fault corresponding to the selected solution.

To provide an example illustrating the method of FIG. 1, consider a scenario wherein a cloud architect wants to provision a LAMP Stack environment to an end user. LAMP Stack is a complete PHP, MySQL and Apache environment for Linux. Let's assume the stack is to be launched in a VMware environment. Upon receipt of a service request (identifying the required service elements) for launching a LAMP stack in a VMware environment, a solutions repository is accessed to identify solutions which may be applied proactively on the identified service elements to prevent potential issues or problems. The issues could be as simple as high file system usage leading to eventual exhaustion of available storage or it could be just enabling the balloon driver in a target Virtual Machine (VM) so that costly memory reclamation methods can be avoided and performance counters at VM level can be enabled for better VM level monitoring. In either case, the identified solutions are highlighted to a user for making a selection, and upon user selection the highlighted solution is applied to the service element to prevent the occurrence of the problem. It ensures that a service template (i.e. the workload deployed) is fault tolerant towards known issues on a LAMP Stack environment.

Applying a selected solution to a service element fortifies or immunizes the service element and consequently the service template containing the service element against a corresponding potential fault. Thus, an immunized template may be created comprising an immunized service element (or service elements). An immunized template may be used in future for creating a new service instance. Since a new service instance is based on an immunized template, it would be automatically fortified from a potential fault against which a solution was earlier applied to the template. In an implementation, time stamping may be used to track different versions of a template and to identify the latest available template for a given cloud service.

Figure 5:
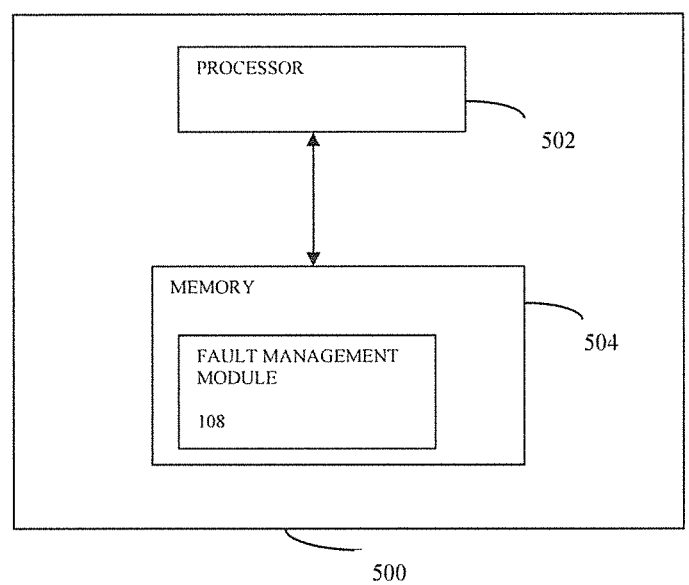
FIG. 5 illustrates a system for facilitating a fault management service in a cloud, according to an example.

FIG. 5 illustrates an example system 500 for facilitating a fault management service in a cloud. System 500 includes a processor 502 that executes instructions in a memory 504. The memory 504 includes a fault management module 108 to determine upon requisition of a new service template comprising a service element provided by a cloud whether solutions are available for prevention of potential faults related to the service element, highlight the available solutions for prevention of potential faults related to the service element for selection, and upon selection of a solution, apply the selected solution to the service element.

For the purpose of simplicity of explanation, the example method of FIG. 2 is shown as executing serially, however it is to be understood and appreciated that the present and other examples are not limited by the illustrated order. The example system of FIG. 1 and method of FIG. 2 may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and be executed by a processor.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It would be appreciated that the system components depicted in the illustrated figures are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

The invention claimed is:

1. A method executed by a computer system of providing fault management in a cloud, comprising:
   receiving a service request that requisitions a cloud service involving a service element provided by the cloud;
   determining, in response to the service request and during the requisitioning of the cloud service involving the service element provided by the cloud, whether solutions are available for potential faults related to the service element;
   highlighting the available solutions for the potential faults related to the service element to a user; and
   in response to selection, by the user, of a selected solution from among the highlighted available solutions, applying the selected solution to the service element.

2. The method of claim 1, wherein the selected solution is applied prior to deployment of the cloud service involving the service element.

3. The method of claim 1, wherein the selected solution is applied prior to an occurrence of a fault corresponding to the selected solution.

4. The method of claim 1, wherein the determining of whether the solutions are available for the potential faults related to the service element involves searching a repository comprising solutions for potential faults related to the service element.

5. The method of claim 4, further comprising updating the repository with new solutions for potential faults related to the service element.

6. The method of claim 1, wherein the highlighted available solutions are tagged with self-explanatory details.

7. The method of claim 1, wherein the available solutions are classified according to a criterion.

8. The method of claim 7, wherein the criterion includes one of a domain, user recommendation, performance, security and configuration.

9. The method of claim 1, wherein the highlighted available solutions are displayed in a user interface for selection by the user.

10. The method of claim 1, wherein the service request identifies the service element.

11. A system, comprising:
    a processor; and
    a non-transitory storage medium storing instructions executable on the processor to:
      receive a service request that requisitions a cloud service, the service request identifying a service element provided by a cloud, the service element identified in the service request for use in providing the cloud service;
      determine, in response to the service request and during requisitioning of the cloud service involving the service element provided by cloud, whether solutions are available for prevention of potential faults related to the service element;
      highlight, in a graphical user interface, the available solutions for prevention of potential faults related to the service element; and
      in response to selection, in the graphical user interface, of a selected solution from among the highlighted available solutions, apply the selected solution to the service element prior to deployment of the cloud service.

12. The system of claim 11, further comprising a solutions repository, wherein the solutions repository includes the available solutions for prevention of the potential faults related to the service element.

13. The system of claim 12, wherein the solutions repository is present in the cloud.

14. The system of claim 12, wherein the instructions are executable on the processor to update the solutions repository with new solutions for prevention of potential faults related to the service element.

15. The system of claim 11, wherein the highlighting of the available solutions in the graphical user interface comprises displaying category information with the available solutions in the graphical user interface, the displayed category information specifying that a first solution of the highlighted available solutions belongs to a first category, and a second solution of the highlighted available solutions belongs to a second category different from the first category.

16. The system of claim 11, wherein the service request further identifies additional service elements to deploy the cloud service.

17. A non-transitory processor readable medium comprising machine executable instructions that when executed cause a system to:
    receive a service request that requisitions a cloud service involving a service element provided by a cloud;
    determine, in response to the service request and during requisitioning of the cloud service involving the service element provided by the cloud, whether solutions are available for prevention of potential faults related to the service element;

highlight, in a user interface, the available solutions for prevention of potential faults related to the service element; and in response to selection, in the user interface, of a selected solution from among the highlighted available solutions, cause application of the selected solution to the service element.

18. The non-transitory processor readable medium of claim 17, wherein the service request identifies the service element.

19. The non-transitory processor readable medium of claim 17, wherein the highlighting of the available solutions in the user interface comprises displaying category information with the available solutions in the user interface, the displayed category information specifying that a first solution of the highlighted available solutions belongs to a first category, and a second solution of the highlighted available solutions belongs to a second category different from the first category.

20. The non-transitory processor readable medium of claim 17, wherein the selected solution is applied prior to deployment of the cloud service specified by the service request.

* * * * *